United States Patent Office 3,269,973
Patented August 30, 1966

3,269,973
THERMOSET RESINS FROM POLY(METHYLOL)-
DIAROMATIC ETHER COMPOUNDS
James D. Doedens, Midland, and Earl H. Rosenbrock,
Auburn, Mich., assignors to The Dow Chemical Company, Midland, Mich., a corporation of Delaware
No Drawing. Filed May 26, 1961, Ser. No. 112,771
8 Claims. (Cl. 260—37)

The present invention relates to novel thermoset resins and methods for their preparation. More particularly, the invention concerns certain reaction products of poly-(methylol)diaromatic ether compounds.

The thermoset resins of the present invention are highly efficacious for employment as binders in molding compositions and as adhesives in the construction of laminate articles. The resins are essentially off-white or light colored, depending upon the catalyst employed to effect their cure, and have excellent resistance to the action of acids and the alkalies. The advantages that are obtained by starting with lighter colored molding and binding resins, which can be subsequently modified with suitable pigments to provide any desired color, are manifest.

Principal objects of the present invention are to provide novel thermoset compositions useful as a binding component of molding and adhesive compositions. In particular, it is an object of the invention to provide novel thermoset compositions of certain poly(methylol)diaromatic ether compositions. A further object is to provide essentially light-colored or off-white thermoset resins. Additional objects are to provide thermoset resins having excellent resistance to the action of water, acids and the akalies. Other objects and benefits will become manifest hereinafter as the invention is more fully described.

In accordance with the present invention, the above objects are accomplished in a thermoset resin obtained as a condensation or dehydration reaction product of certain poly(methylol)diaromatic ether compositions corresponding to the general formula:

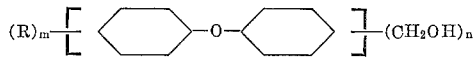

wherein R is an alkyl, aryl, alkoxy or halogen radical, the alkyls containing from 1 to 4 carbon atoms and the aryls containing from 6 to 10 carbon atoms. $m$ is an integer from 0 to 2 and $n$ is a number from about 1.3 up to and inclusive of 4. The manner of representing the ring substituent R means that it may or may not be present, and when present, as many as 1 or 2 of such substituent groups may be found on the diaromatic ether nucleus in any position ortho, meta or para to the ether linkage. While only those poly(methylol)diaromatic ethers having 2 to 4 methylol groups per aromatic ether molecule are individually operable in the invention, mixtures of such compounds with those of monomethylol functionality in which mixtures the average methylol functionality is less than 2 are also operable. "Methylol functionality," for the purposes of the present invention, is defined as the average number of substituent methylol groups per diaromatic ether molecule of the thermosettable composition. Like the substituent R, the methylol groups may be found on the diaromatic ether nucleus in any ring position ortho, meta or para to the ether linkage.

To be operable, mixtures must have an average degree of methylol functionality of at least about 1.3 per molecule in order to provide a thermoset product when polymerized. Most advantageous results are obtained, however, when the average methylol functionality is above about 2.2 per molecule. Thermoset products that are obtained from the polymethylol compositions at or slightly above the lower methylo functionality limit require long reaction or curing times during which period there is a pronounced tendency for the resins to flow excessively and consequently separate from the filler before they are thermoset. Such difficulty is not experienced in thermo-setting compositions having a methylol functionality above the preferred limit.

The methylol diaromatic ethers of the invention are prepared by hydrolyzing the corresponding halomethyl-ated diaromatic ethers having the general formula:

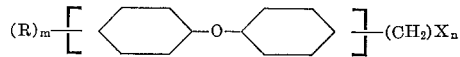

wherein the symbols, R, $m$ and $n$ are as defined above and X is selected from the group consisting of chlorine and bromine. It will be observed that to provide the compositions of the invention, the halogen is replaced by a hydroxyl group. Such replacement is conveniently accomplished by hydrolysis.

The hydrolysis reaction can be carried out in various ways. For example, the halomethyl intermediates can be hydrolyzed to the desired methylol compounds by re-fluxing solutions thereof in acetone, methyl ethyl ketone, dioxane or the like, with excess aqueous alkali metal carbonate, bicarbonate or hydroxide over that required for a stoichiometric reaction with the available halomethyl groups. Usually, it is most convenient to maintain such a reaction mixture at its reflux temperature which, depending upon the particular solvent media employed, may range from about 45° C. up to about 160° C. While an effective amount of the desired hydrolyzed product is obtained within a few minutes of the initial contacting of the reactants, it is generally desirable in order to obtain a substantial conversion of the reactants to the desired product to continue reaction conditions for as much as several hours. The reaction end point or any desired level of conversion can be determined by chemical analysis for halogen content in a portion of water washed reaction product. Upon completion of the reaction, the solvent is stripped from the reaction product under reduced pressures and the product mass washed with water to remove soluble alkali salt impurities and unreacted excess alkali reagents. Such operations can be simultaneously accomplished by distilling off the solvent while concurrently adding an amount of water to the reaction mixture at a rate substantially equal to that of the solvent removal. This procedure causes the formation of a precipitate of the desired poly(methylol)diaromatic ether which is conveniently separated by filtration. The insoluble filter cake can be further washed by reslurrying it with water and refiltering. Thereafter, the desired product is dried.

The halomethylated diaromatic ethers utilized as starting materials in the above hydrolysis reaction are well known. They are obtained as reaction products of the halomethylation of diphenyl oxide and alkyl, aryl, alkoxy and/or halosubstituted diphenyl oxides. Methods for their preparation are taught in United States Letters Patent No. 2,911,380. Usually, such methods yield product mixtures consisting of several halomethyl derivatives of the particular diaromatic ether employed in the halomethylation reaction. In the practice of the invention, it is convenient to employ such mixtures, so long as they have an average halomethyl functionality of at least 1.3, preferably 2.2, to provide the corresponding mixed, thermosettable polymethylol compositions. If desired, however, such halomethylated reaction products can be separated to provide the individual components thereof by such means as fractional distillation at moderate temperatures under reduced pressures. Individual halomethylated diaromatic ethers that can be employed to produce the corresponding methylol compounds for use in the invention include di-, tri- and tetra(chloromethyl)diphenyl oxide, di-, tri- and tetra(bromomethyl)diphenyl oxide, di-, tri- and tetra(chloromethyl)ditolyl oxide, di(chloromethyl) di(biphenyl) oxide, tri(chloromethyl) di(ethoxyphenyl) oxide, tri(chloromethyl) di(butoxyphenyl) oxide, tri(chloromethyl) di(butylphenyl) oxide, di(bromomethyl)ethylphenyl phenyl ether, di(chloromethyl) di(chlorophenyl) oxide and the like di-, tri- and tetrahalomethylated diaromatic ethers. The preferred polyhalomethylated ethers having a functionality above about 2.2 are obtained by conducting the halomethylation reaction for an extended period of time so as to obtain a relative predominance of the higher functional derivatives. The extent of the chloromethylation reaction can be determined by analyzing portions of the reaction mass for halogen content.

Another method for making the poly(methylol)diaromatic ethers of the invention is to form an emulsion of the corresponding polyhalomethylated ether in an aqueous alkali hydroxide solution employing an oil-in-water emulsifying agent such as the well known alkyl sulfonates, alkyl aryl sulfonates, polyether non-ionics, alkyl sulfates or sulfonated alkyl aryl ethers, most advantageously the sulfonated dodecyldiphenyl ethers. The emulsion is constantly agitated while being heated at a temperature from about 80° to 100° C. for a period of time sufficient to hydrolyze the halomethyl groups to corresponding methylol groups. From about 0.5 to 2 weight percent of the emulsifying agent based on the weight of the organic phase and from about 20 to 98 percent by weight of water based on the total composition are employed with advantage. Usually the extent of hydrolysis is increased by increasing the total amount of water in the emulsion. The upper limit of the water content is based on economic considerations only. By following the reaction with Volhard halide analysis of portions of the reaction mass, it is possible to determine when hydrolysis is complete or substantially complete.

In either of the above methods for carrying out the hydrolysis reaction, considerable latitude exists as to the proportions of reactants that may be employed. The alkali metal carbonate, bicarbonate or hydroxide is advantageously used in an amount up to as much as 10 percent in excess of the stoichiometric requirements based on the halogen content of the halomethylated diaromatic ether composition together with at least a stoichiometric amount of water.

The thermoset products of the invention are formed by mass condensing the poly(methylol)diaromatic ethers in the presence of a catalyst for the reaction at temperatures at or above the melting point of the ethers. During the reaction, water is given off as a by-product and the ceasing of its evolution is a convenient determinant of the reaction end point. Higher condensation temperatures up to the decomposition temperature of the resin, i.e., up to about 400° C., can be employed but temperatures within the range from about 140° to 180° C. are preferred. The thermosetting reaction times vary from as much as one hour for the lower polymethylol derivatives down to a few seconds to several minutes for the higher polymethylol derivatives. Such reaction times are also dependent, as will be apparent to those skilled in the art, upon the catalyst utilized, the temperatures employed in curing and the thickness of the mass to be cured.

The thermosetting compositions of the invention, whether filled or unfilled, are highly useful as molding compositions or binders for particles, sheet, fibrous or fabric materials such as may be employed to prepare molded or laminate articles of construction.

Illustratively, the poly(methylol)diaromatic ethers are mixed with an acid catalyst, preferably in the form of a solution. The solvent medium can be any organic solvent in which both the acid catalyst and polymethylol ether are mutually soluble. While in solution form, the resin-forming composition is applied to a desired filler by spraying or pouring the solution onto the filler or by dipping it in the solution. The excess liquid is permitted to drain off and, desirably, the coated filler is further dried before being subjected to molding pressures at elevated curing temperatures. Enough of the thermosetting composition should be applied to the filler masses to be bound to insure that the ultimately obtained thermoset resinous mass will be adequate for binding the filler. Usually, a cured resin-binder content of from about 2 up to 100 percent by weight based on the weight of the filler is sufficient. Large amounts can be employed, if desired. To obtain this end, variables obvious to those skilled in the art such as the concentration of the resin-forming composition in the solvent medium, its rate of application and extent of drain off, the retentive capacity of the filler and the like factors, will determine the quantity of the resinforming polymethylol ether composition of the invention that is retained on the filler. Curing temperatures that are applicable to the unfilled compositions are also applicable to those which are filled. However, somewhat longer times may be necessary due to the heat capacity of the inert filler.

Catalysts that can be employed in the preparation of the thermoset products of the invention are dehydrating catalysts. Included, for example, are Friedel-Crafts catalysts such as zinc chloride, aluminum chloride, ferric chloride, boron trifluoride, stannic chloride, antimony chloride, phosphorus pentoxide and the like. Also operable are strong protonic acids such as hydrofluoric, hydrofluoric, hydrochloric, hydrobromic, phosphoric, sulfuic, organic sulfonic and the like acids. In addition, basic catalysts such as the alkali metal and ammonium hydroxides and carbonates can be used to catalyze the condensation reaction.

Inert fillers that may be bound with the thermoset resin of the invention include siliceous fillers and carbonaceous fillers such as graphite, coke breeze, powdered coal and the like. Other suitable fillers include mineral and synthetic fibers, glass wool or fiber, asbestos, fly ash, mica flour and the like fibrous or granular materials which are substantially inert to the resin-providing composition and do not melt, fuse excessively or decompose at the thermosetting temperatures which may be involved in the manufacture of the desired structures. It should also be understood that organic fillers such as, for example, wood particles, wood flour, walnut shell flour and the like may also be employed when temperatures below those temperatures at which such materials degrade are employed to set or cure the poly(methylol)diaromatic ethers of the invention.

The following examples illustrate the invention but are not to be construed as limiting.

EXAMPLE 1

Several poly(methylol)diphenyl oxide compositions of varying methylol functionality were mass polymerized. To 20 gram samples of each composition were added 6 drops of phosphoric acid and the catalyzed samples placed on a hot plate at 185° C. The length of time required to achieve a thermoset state was determined for each sample heated. The polymethylol compositions employed, their average methylol functionality and composition schedule, and the reaction times required to achieve a thermoset product are set forth in the following Table 1.

Table 1

|  | Polymethylol Composition | | | | |
|---|---|---|---|---|---|
|  | "A" | "B" | "C" | "D" | "E" |
| Average Methylol Functionality | 1.2 | 1.7 | 2.0 | 2.18 | 2.88 |
| Component Schedule, mole percent: | | | | | |
| Diphenyl oxide (DPO) | 17.3 | 1.2 | ----- | 0 | 0 |
| o-Monomethylol DPO | 5.3 | 7.3 | ----- | 0.5 | 0 |
| m-Monomethylol DPO | ----- | 1.5 | ----- | ----- | ----- |
| p-Monomethylol DPO | 42.9 | 33.3 | ----- | 4.7 | 0.04 |
| o,p'-Dimethylol DPO | 10.8 | 20.0 | ----- | 35.4 | 1.9 |
| m,p'-Dimethylol DPO | ----- | 1.1 | ----- | ----- | ----- |
| p,p'-Dimethylol DPO | 20.6 | 30.0 | 100 | 37.7 | 8.6 |
| Trimethylol DPO | 2.3 | 5.4 | ----- | 21.1 | 89.0 |
| Tetramethylol DPO | 1.0 | 1.1 | ----- | 1.0 | ----- |
| Curing Time (minutes) | (¹) | 32 | 17 | 10 | 6 |

¹ Did not thermoset.

EXAMPLE 2

To 15 gram samples of the poly(methylol)diaromatic ether composition designated "D" in the foregoing example, were added 5 drops of various catalyst compositions. Whenever the catalyst employed was a solid, it was utilized in the form of a 50 percent methanol solution. The catalyzed mixtures were then placed on a hot plate at 165° C. whereupon they polymerized to thermoset products. The particular catalyst employed, reaction time and properties of the thermoset product as well as stroke cure times of the catalyzed resin are set forth in the following Table 2.

Table 2

| Run No. | Catalyst Composition | Reaction Time, min. | Color of Thermoset Product | Stroke Cure Time,¹ min. |
|---|---|---|---|---|
| 1 | H₃PO₄ | 15 | Light yellow | 3.5 |
| 2 | 50 percent ZnCl₂ in CH₃OH. | 35 | ---do--- | 5.0 |
| 3 | 50 percent FeCl₃ in CH₃OH. | 15 | Dark brown ² | 3.0 |
| 4 | 50 percent NaOH in H₂O. | 35 | Yellow | 5.0 |

¹ Stroke cure times were obtained by placing one gram of the catalyzed compositions on a hot plate at 180° C. and stroking them with a metal spatula until a gel was obtained.
² Dark brown coloring was due to the presence of FeCl₃.

All of the above thermoset products were insoluble in acetone, benzene and toluene. They exhibited excellent resistance to the action of water alkalies and acids.

EXAMPLE 3

A solution of 25 grams of the poly(methylol)diphenyl oxide composition "D" was prepared in 25 grams of acetone. To the resulting solution was added 5 drops of phosphoric acid. The catalyzed solution was thoroughly mixed with 25 grams of wood flour and the mixture spread on paper whereupon the acetone evaporated leaving a residue of wood flour coated with the catalyzed poly(methylol)diphenyl oxide composition.

This composition was placed in a circular mold 2 inches in diameter by ½ inch thick. The mold contents were then pressed to a ¼ inch thickness under a pressure of from 500 to 600 pounds per square inch with the simultaneous application of heat at a temperature of about 152° C. for 15 minutes. The product obtained was a light tan circular molding 2 inches in diameter by ¼ inch thick. It was placed in a 5 percent sodium hydroxide solution for 90 days at 25°–30° C. after which the molding still retained its original properties. Thermoset phenolic resoles would have completely disintegrated under similar conditions.

In another operation, asbestos rovings were substituted for the wood flour in the foregoing operation and the molding composition thus prepared was pressed and cured in an identical fashion. The cured products were gray-white in color and appeared quite similar to commercially available asbestos-filled plastics. After exposure to a 5 percent solution of sodium hydroxide for 90 days, there was no visual indication of deterioration or other property loss.

In a manner similar to that of the foregoing examples, other fillers normally employed in commercial plastics such as walnut shell flour, saw dust, wood chips, glass wool, glass fibers, plywood sheeting, paper or fabric mixed or coated with a suitably catalyzed di(methylol)diphenyl oxide, tri(methylol)diphenyl oxide, tetra(methylol)diphenyl oxide compositions or mixtures of poly(methylol)diphenyl oxide compositions having an average methylol functionality per molecule of at least about 1.3, preferably about 2.2, can be molded or laminated to provide useful articles by subjecting such compositions to molding pressures and elevated temperatures above the melting point of the methylol diphenyl oxide composition.

What is claimed is:

1. A thermoset composition of matter obtained by heating a composition comprising poly(methylol)diaromatic ether composition above its melting point in the presence of a small but effective amount of a dehydrating catalyst, said poly(methylol)diaromatic ether composition being characterized by the general formula:

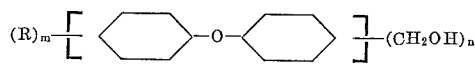

wherein R is selected from the group consisting of alkyl, aryl, alkoxy and halogen radicals, the alkyls containing from 1 to 4 carbon atoms and the aryls containing from 6 to 10 carbon atoms, $m$ is an integer from 0 to 2 and $n$ is a number from about 1.3 up to and inclusive of 4.

2. A thermoset composition of matter obtained by heating a composition comprising poly(methylol)diaromatic ether composition above its melting point in the presence of a small but effective amount of a dehydrating catalyst, said poly(methylol)diaromatic ether composition being characterized by the general formula:

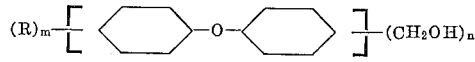

wherein R is selected from the group consisting of alkyl, aryl, alkoxy and halogen radicals, the alkyls containing from 1 to 4 carbon atoms and the aryls containing from 6 to 10 carbon atoms, $m$ is an integer from 0 to 2 and $n$ is a number from about 2.2 up to and inclusive of 4.

3. A thermoset composition of matter obtained by heating a composition comprising poly(methylol)diphenyl oxide composition having an average of from about 1.3 up to and inclusive of 4 methylol groups per molecule above its melting point in the presence of a small but effective amount of a dehydrating catalyst.

4. A molded article comprising an inert filler and the thermoset composition of claim 1.

5. A molded article comprising an inert filler and the thermoset composition of claim 2.

6. The method for fabricating thermoset, integral, composite structures which comprises blending an inert filler material with from about 2 up to about 100 percent by weight based on the weight of the filler of a poly(methylol)diaromatic ether composition and a small but effective amount of a dehydrating catalyst and thereafter subjecting the blend to temperatures above the melting point of the poly(methylol)diaromatic ether composition until said blend is thermoset, said poly(methylol)diaromatic ether composition being characterized by the general formula:

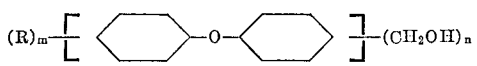

wherein R is selected from the group consisting of alkyl, aryl, alkoxy and halogen radicals, the alkyls containing from 1 to 4 carbon atoms and the aryls containing from 6 to 10 carbon atoms, $m$ is an integer from 0 to 2 and $n$ is a number from about 1.3 up to and inclusive of 4.

7. The method according to claim 6 wherein the blended mass is molded to a desired shape prior to curing.

8. The method of claim 6 wherein the poly(methylol) diaromatic ether composition is blended with the inert filler in the form of a liquid dispersion.

References Cited by the Examiner

UNITED STATES PATENTS

| 2,606,929 | 8/1952 | Martin | 260—52 |
| 2,636,875 | 4/1953 | Martin | 260—52 |

OTHER REFERENCES

Megson, N. G. L.: Phenolic Resin Chemistry, Academic Press, New York, 1958, page 120.

WILLIAM H. SHORT, *Primary Examiner.*

HAROLD BURSTEIN, *Examiner.*

W. G. GOODSON, *Assistant Examiner.*